United States Patent
Goldman

(10) Patent No.: US 9,129,296 B2
(45) Date of Patent: Sep. 8, 2015

(54) AUGMENTING RECOMMENDATION ALGORITHMS BASED ON SIMILARITY BETWEEN ELECTRONIC CONTENT

(71) Applicant: Adobe Systems Incorporated, San Jose, CA (US)

(72) Inventor: Oliver Isaac Goldman, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 334 days.

(21) Appl. No.: 13/650,249

(22) Filed: Oct. 12, 2012

(65) Prior Publication Data
US 2014/0108316 A1 Apr. 17, 2014

(51) Int. Cl.
*G06F 17/00* (2006.01)
*G06N 5/02* (2006.01)
*G06Q 30/02* (2012.01)
*G06Q 50/00* (2012.01)
*G06N 5/04* (2006.01)
*G06N 99/00* (2010.01)
*G06N 5/00* (2006.01)

(52) U.S. Cl.
CPC ............ *G06Q 30/02* (2013.01); *G06Q 30/0241* (2013.01); *G06Q 50/01* (2013.01); *G06N 5/003* (2013.01); *G06N 5/02* (2013.01); *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 8,185,558 B1 * | 5/2012 | Narayanan et al. | 707/798 |
| 2005/0076093 A1 * | 4/2005 | Michelitsch et al. | 709/217 |
| 2009/0163183 A1 * | 6/2009 | O'Donoghue et al. | 455/414.1 |
| 2011/0029884 A1 * | 2/2011 | Grosz et al. | 715/739 |

* cited by examiner

*Primary Examiner* — Kakali Chaki
*Assistant Examiner* — Ababacar Seck
(74) *Attorney, Agent, or Firm* — Kilpatrick Townsend & Stockton LLP

(57) ABSTRACT

Systems and methods for augmenting recommendation algorithms based on similarity between electronic content items are provided. In one embodiment, a content management application executed by a processor identifies at least one first electronic content item associated with a first client. The content management application determines that the first electronic content item is similar to at least one second electronic content item associated with a second client. The content management application generates an association between the first electronic content item and the second electronic content item. The association is based on the first electronic content item and the second electronic content item being similar to each another. The content management application generates a recommendation output based at least partially on the association between the first electronic content item and the second electronic content item.

20 Claims, 9 Drawing Sheets

AUGMENTING RECOMMENDATION ALGORITHMS BASED ON SIMILARITY BETWEEN ELECTRONIC CONTENT

TECHNICAL FIELD

This disclosure relates generally to computer-implemented methods and systems and more particularly relates to augmenting recommendation algorithms based on similarity between electronic content items.

BACKGROUND

Online services can augment desktop software applications used to generate, modify, or otherwise use electronic content by, for example, recommending additional electronic content. For example, online services may provide a virtual community for sharing electronic content used by desktop applications. Electronic content shared via online services, such as cloud services, can generate data regarding clients of the online services, electronic content posted to or modified via the online services through respective client accounts, electronic content provided via the online services and browsed by respective clients, etc. An online service may use data gathered about a client's browsing history to recommend additional content items that a user of a client account may be interested in viewing. Recommendations may induce clients to spend more time using the online service.

Prior solutions have used methods such as collaborative filtering to make recommendations to a client. Collaborative filtering can include making automatic predictions about the interests of user of a client account by collecting preferences or taste information from many clients. Prior solutions for making recommendations have also used graph-based approaches to make recommendations to a client based on links between a first client and other clients classified as "friends" of the first client.

These prior solutions rely on data that is generated using information entered by clients, such as a client's past use of electronic content or a client account's actions creating a link to another client account (e.g., identifying another client account as a "friend"). For example, collaborative filtering methods rely on clients' past use of electronic content. Prior graph-based approaches have relied on clients to take actions that generate links between the clients.

SUMMARY

One embodiment involves identifying at least one first electronic content item associated with a first client account. The embodiment further involves determining that the first electronic content item is similar to at least one second electronic content item associated with a second client account. The embodiment further involves generating an association between the first electronic content item and the second electronic content item. The association is based on the first electronic content item and the second electronic content item being similar to each another. The embodiment further involves generating a recommendation output based at least partially on the association between the first electronic content item and the second electronic content item.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
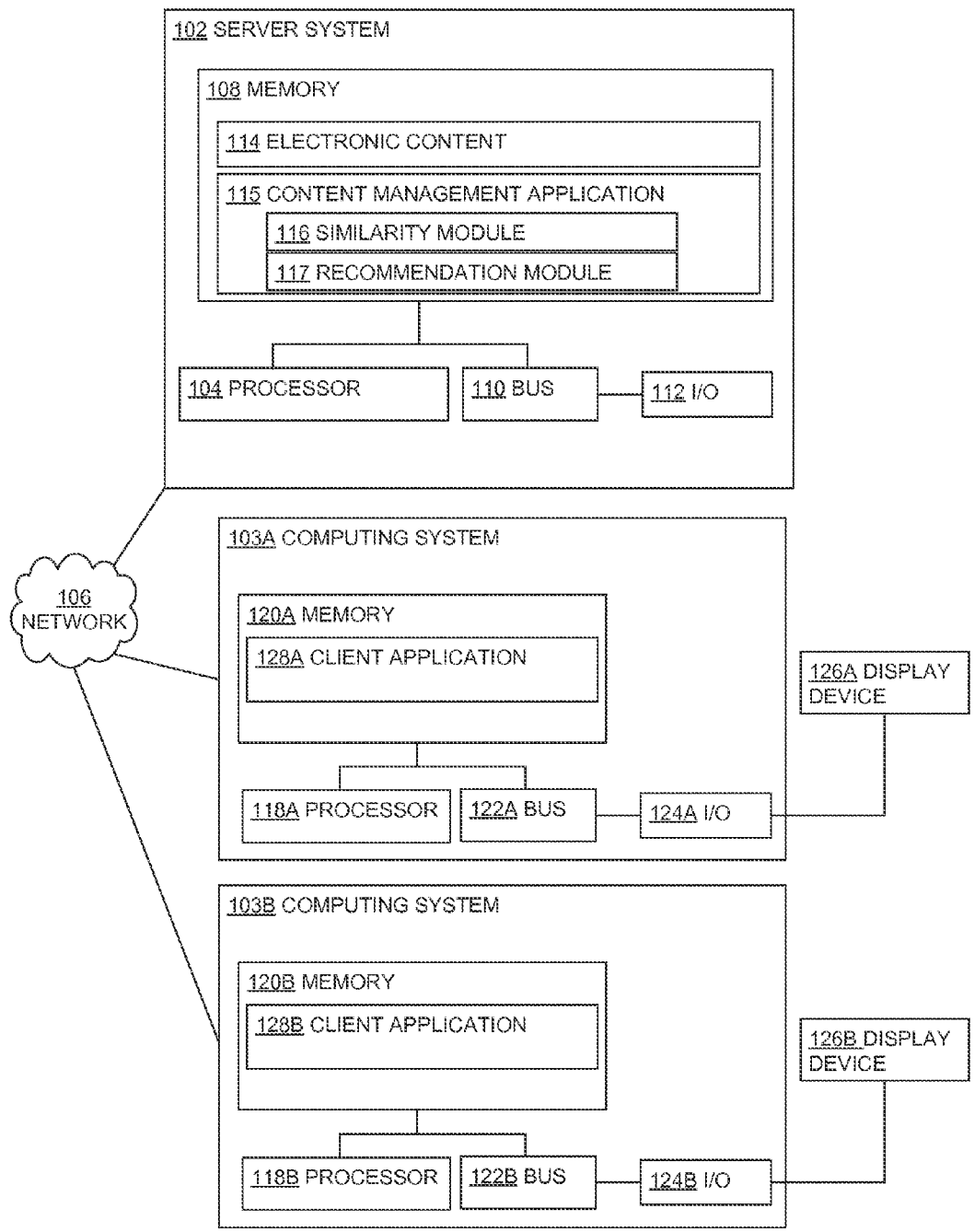
FIG. 1 is a block diagram depicting example computing systems for implementing certain embodiments.

Computer-implemented systems and methods are disclosed for augmenting recommendation algorithms using similarity between electronic content items. For example, a recommendation application can be applied by an online service. A first and second client account of the online service may each have one or more images associated with the respective client accounts. For example, each of the client accounts may be used to post a respective image to the online service. Each of the images may include similar content, such as the same object included in both images or a similar color palette used in both images. A similarity algorithm executed or otherwise used by the online service can generate a link between the similar images, thereby allowing the online service to recommend the image associated with the first client account as content potentially of interest to a user of the second client account, and vice versa. The recommendation application can generate the recommendation based at least partially on the similarity of the images, regardless of whether the client accounts are otherwise associated in the online service (e.g., being identified as "friends" with one another or being associated with a common group in the online service). The recommendation application can thus provide recommendations for client accounts of online services, such as cloud services, to further engage users in the use of the online service.

In accordance with one embodiment, a content management application or other application can be provided for recommending electronic content items to client accounts based at least partially on similarities between the electronic content items. The content management application can execute or otherwise use a similarity algorithm to identify at least one first electronic content item associated with a first client account. The content management application can determine that the first electronic content item is similar to at least one second electronic content item associated with a second client account. The content management application can generate an association between the first electronic content item and the second electronic content item. The association can be based on the first electronic content item and the second electronic content item being similar to each another. An association between the first and second electronic content items can be represented as a link between nodes in a social graph representing the first and second electronic content items. A recommendation module of the content management application can generate a recommendation output based at least partially on the association between the first electronic content item and the second electronic content item. Non-limiting examples of algorithms used by a recommendation application for generating recommendations include a random walk algorithm, a spreading activation algorithm, etc.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "client account" is used to refer to an identifier for an entity, such as an individual used by an application and/or a device executing an application to access an online service or other application. A client account can also include one or more authentication credentials, such as a password, personal identification number, a security question and an associated answer, etc. In some embodiments, a single client corresponding to a single client account can be associated with a single computing device. In other embodiments, multiple clients corresponding to multiple respective accounts can be associated with a single computing device. In other embodiments, a single client corresponding to a single client account can be associated with multiple computing devices.

As used herein, the term "recommendation" is used to refer to an output provided to a client account that includes an electronic content item or a reference to an electronic content item that is provided based (at least partially) on criteria other than the electronic content item matching search criteria provided by the client account.

As used herein, the term "link" is used to refer to associations among client accounts of a service and items of electronic content accessible via the service. Non-limiting examples of links between client accounts include client accounts identified as "friends", client accounts associated with a common group, or other associations between client accounts. Non-limiting examples of links between client accounts and electronic content include electronic content posted through a respective client account, electronic content tagged by a respective client account (such as electronic content on which a client account has commented or which a client account has "liked"), electronic content modified by a respective client account, and electronic content otherwise used or accessed by a respective client account.

In some embodiments, links can be generated explicitly. Explicitly generating a link may include a first client account taking an action that creates a link to a second client account and/or electronic content associated with a second client account, such as identifying the second client account as a "friend." In other embodiments, links can be generated implicitly. Implicitly generating a link may include a first client account accessing or otherwise using electronic content associated with a second client account, such as adding a tag to an electronic content item provided by the second client account to an online service.

As used herein, the term "social graph" is used to refer to a group of electronic content items, a group of entities (such as client accounts) associated with the electronic content items, and a group of associations among the electronic content items and entities.

As used herein, the term "similarity" is used to refer to shared attributes among multiple electronic content items having values within a specified range. Similarity algorithms can identify similarities between different electronic content items, such as (but not limited to) images or segments of video, textual documents, etc. Non-limiting examples of similarities can include images having similar color palettes, images including the same or similar objects, images otherwise having similar content, text documents having one or more identical phrases, electronic content items having metadata values describing common geographic locations or time periods, electronic content items having metadata values describing similar tags, etc.

As used herein, the term "metadata" is used to refer to information associated with (and generally but not necessarily stored with) an electronic content item that describes a feature of the electronic content item. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by a client application using the electronic content item.

In additional or alternative embodiments, the recommendation application can automatically determine that the first and second electronic content items are similar to one another and automatically generate the association to create a link between the electronic content items. Automatically generating a link can include generating a link based on one or more events, such as the execution of a similarity algorithm, other than events that are triggered solely by client accounts, such as a first client account being associated with a second client account or the first client account accessing or otherwise using an electronic content item associated with the second client account. Automatically determining that the first and second electronic content items are similar to one another can include the recommendation application executing the similarity algorithm independently from input received from the first client account or the second client account.

In additional or alternative embodiments, the recommendation application can associate weights with various links between nodes in a social graph. In some embodiments, weights can be associated with links in a social graph based on additional data identifying electronic content items of potential interest to a user of a client account. For example, preference data associated with a client account may be used to increase the weight of a link to an electronic content item that corresponds to the preference data. Preference data can include, for example, geographical locations, time periods, specific authors of electronic content, specific applications for using electronic content items, etc. In other embodiments, weights can be associated with links in a social graph based on a degree of similarity between at least one electronic content item and each similar electronic content item. For example, each electronic content item may be linked to multiple electronic content items, each of which has a progressively smaller degree of similarity with the first electronic content item. The respective weights of each link can decrease in relation to decreasing degrees of similarity.

Referring now to the drawings, FIG. 1 is a block diagram depicting exemplary computing systems for implementing certain embodiments. The exemplary computing systems include a server system 102 and computing systems 103a, 103b in communication via a network 106.

The server system 102 comprises a computer-readable medium such as a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other suitable processing device. The processor 104 can include any of a number of computer processing devices, including one. Such a processor can include or may be in communication with a computer-readable medium storing instructions that, when executed by the processor 104, cause the processor to perform the steps described herein.

The server system 102 can provide access to electronic content 114. The electronic content 114 may be resident in any suitable computer-readable medium and execute on any suitable processor. In one embodiment, the electronic content 114 can reside in the memory 108 at the server system 102. In another embodiment, the electronic content 114 can be accessed by the server system 102 from a remote location via the network 106 and provided to the computing systems 103a, 103b.

A content management application 115 stored in the memory 108 can configure the processor 104 to manage and provide access to electronic content 114. The content management application 115 can configure the processor 104 to store some or all of the electronic content 114 in the memory 108 or any other suitable computer-readable medium. The content management application 115 may provide a social media service, a cloud service, or other network service providing access to electronic content by multiple client accounts. A cloud service can include a collection of computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

The content management application 115 can include a similarity module 116 and a recommendation module 117. Although the similarity module 116 and the recommendation module 117 are depicted in FIG. 1 and described herein as separate logical modules of a content management application 115 for ease of reference, other implementations are possible. In some embodiments, the content management application 115, similarity module 116, and/or the recommendation module 117 can be separate applications that separately executed by the processor 104. In other embodiments, the content management application 115, similarity module 116, and/or the recommendation module 117 can be a combined logical module executed by the processor 104.

The server system 102 may also comprise a number of external or internal devices such as input or output devices. For example, the server system 102 is shown with an input/output ("I/O") interface 112. A bus 110 can also be included in the server system 102. The bus 110 can communicatively couple one or more components of the server system 102.

FIG. 1 also illustrates the content management application 115 comprised in the memory 108 of the server system 102. The content management application 115 can include one or more modules. The content management application 115 can configure the server system 102 to modify, provide, or otherwise use the electronic content 114 in response to input provided by the client applications 128a, 128b. The content management application 115 can also configure the server system 102 to allow multiple computing systems 103a, 103b or other client systems to access or otherwise use some or all of the electronic content 114. In some embodiments, the content management application 115 can store data in the memory 108 identifying client accounts via which the client applications 128a, 128b can access the content management application 115. In other embodiments, the content management application 115 can access data from a remote data source that identifies client accounts via which the client applications 128a, 128b can access the content management application 115. The content management application 115 can store data describing associations between client accounts and items of the electronic content 114.

The server system 102 can include any suitable computing system for hosting the content management application 115. In one embodiment, the server system 102 may be a single computing system. In another embodiment, the server system 102 may be a virtual server implemented using a number of computing systems connected in a grid or cloud computing topology.

Each of the computing systems 103a, 103b comprises a computer-readable medium such as processors 118a, 118b, respectively. Each of the processors 118a, 118b is communicatively coupled to a memory 120a, 120b, respectively. Each of the processors 118a, 118b respectively executes computer-executable program instructions and/or accesses information stored in the memory 120a, 120b. Each of the processors 118a, 118b may comprise a microprocessor, an ASIC, a state machine, or other processor. Each of the processors 118a, 118b can include any of a number of computer processing devices, including one. Such a processor can include or may be in communication with a computer-readable medium. The computer-readable medium stores instructions that when executed by the processor, cause the processor to perform the steps described herein.

A computer-readable medium may comprise, but is not limited to, electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing systems 103a, 103b may also comprise a number of external or internal devices such as a mouse, a CD-ROM, DVD, a keyboard, a display, audio speakers, one or more microphones, or any other input or output devices. For example, each of the computing systems 103a, 103b is respectively shown with input/output ("I/O") interfaces 124a, 124b and display devices 126a, 126b. Buses 122a, 122b can be respectively included in the computing systems 103a, 103b. Each of the buses 122a, 122b can communicatively couple one or more components of the computing systems 103a, 103b.

FIG. 1 also illustrates the client applications 128a, 128b respectively comprised in the memory 120a, 120b of the computing systems 103a, 103b. Each of the client applications 128a, 128b can include one or more software modules. The client applications 128a, 128b can respectively configure the processors 118a, 118b to modify or otherwise access electronic content 114 provided by the server system 102 via the network 106. The client applications 128a, 128b can respectively configure the processors 118a, 118b to respectively render some or all of the electronic content 114 for display at the display devices 126a, 126b. For example, each of the client applications 128a, 128b can be an internet browser application, a social media application, and the like. A network session for accessing or otherwise modifying the electronic content 114 can be established by the client applications 128a, 128b via the network 106 between computing systems 103a, 103b and the server system 102.

Figure 2:
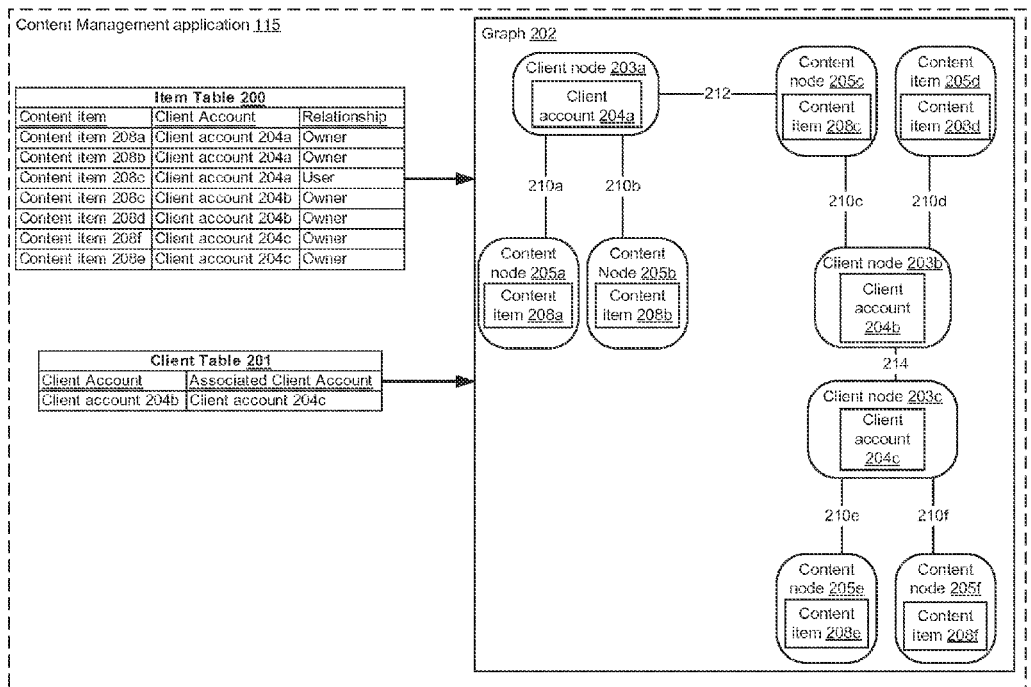
FIG. 2 is a modeling diagram illustrating an example graph depicting associations among client accounts and electronic content items provided by a content management application.

In some embodiments, the computing systems 103a, 103b can include any suitable client devices for communicating via a network 106 and executing the client applications 128a, 128b. Non-limiting examples of a computing device include a desktop computer, a tablet computer, a smart phone, or any other computing device suitable for using electronic content. In other embodiments, the computing systems 103a, 103b can include server systems for providing electronic content items via the client applications 128a, 128b FIG. 2 is a modeling diagram illustrating an example graph 202 depicting associations among client accounts 204a-c and electronic content items 208e-f provided by a content management application 115.

Content management application 115 can access data describing associations between different client accounts and between client accounts and content items. In a non-limiting example depicted in FIG. 2, an item table 200 describe relationships between client accounts 204a-c and content items 208a-e. The client accounts 204a-c can be associated with computing devices, such as the computing systems 103a, 103b, configured to access the content management application 115 via applications such as client applications 128a, 128b. The "owner" relationships among content items and client accounts can identify which client accounts have posted or can modify which content items. The "user" relationships among content items and client accounts can identify which client accounts have accessed or otherwise used which content items that are "owned" by other client accounts. FIG. 2 also depicts a client table 200 describing associations between client accounts. For example, client account 204b is associated with client account 204c.

The item table 200 and client table 201 can be used to generate the graph 202. The graph 202 can include multiple nodes and links between the nodes. Each of the nodes can correspond to one of the client accounts 204a-c and/or one of the electronic content items 208a-f. For example, the graph 202 can include client nodes 203a-c and content nodes 205a-e. The client nodes 203a-c can respectively represent the client accounts 204a-c. The content nodes 205a-e can respectively represent the content items 208a-e.

In additional or alternative embodiments, the graph 202 can also include nodes corresponding to metadata associated with one or more of the electronic content items 208a-f. A non-limiting example of metadata associated with an electronic content item is a tag assigned to the electronic content item.

Associations or other relationships between nodes of the graph 202 can be identified by the links 210a-f, 212, 214. Links can also be referred to as "edges" of a graph. The links 210a-f, 212, 214 can be generated based on the associations between different client accounts depicted in client table 201 and between client accounts and content items depicted in item table 200.

In some embodiments, links between the nodes of the graph 202 can be generated explicitly. One example of an explicit link is a link between a client and electronic content provided by the client to the content management application 115. For example, electronic content items 208a, 208b can be posted to an online service provided by the content management application 115 by a client account 204a. The links 210a, 210b can thus be explicit links between the client account 204a and the electronic content items 208a, 208b. Electronic content items 208c, 208d can be posted to the online service through a client account 204b. The links 210c, 210d can thus be explicit links between the client account 204b and the electronic content items 208c, 208d. Electronic content items 208e, 208f can be posted to the online service through a client account 204c. The links 210a, 210b can thus be explicit links between the client account 204a and the electronic content items 208a, 208b. Another example of an explicit link is a link between a first client and a second client. For example, a link 214 between a first client account 204b and a second client account 204c can identify that the client accounts 204b, 204c are identified as "friends" in an online service provided by the content management application 115. A link 214 between a first client account 204b and a second client account 204c can additionally or alternatively identify that the client accounts 204b, 204c are associated with a common group of clients for an online service provided by the content management application 115.

In other embodiments, links between the nodes of the graph 202 can be generated implicitly. One example of an implicit link is a link between a client and electronic content accessed or otherwise used by the client. For example, a first client account 204a may modify or otherwise use an electronic content item 208c provided by a second client account 204b. The link 212 between the client account 204a and the electronic content item 208c can identify that the first client account 204a has modified or otherwise used the electronic content item 208c provided by the second client account 204b.

A recommendation algorithm applied to the graph 202 can generate recommendations to the client accounts 204a-c. Recommendations can identify electronic content items that are potentially of interest to users of particular client accounts. For example, a recommendation algorithm may determine that the electronic content items 208e is potentially of interest to the client account 204a based on the link 212 between the client account 204a and the electronic content item 208c, the link 210c between the electronic content item 208c and the client account 204b, the link 214 between the client account 204b and the client account 204c, and the link 210e between the client account 204c and the electronic content item 208e. Thus, a recommendation algorithm applied to the graph 202 based on explicit links and implicit links may require traversing each of the intermediate links between the client account 204a and the electronic content item 208e.

Although FIG. 2 depicts a graph 202 having only nine nodes and eight links, a graph may include any number of nodes and links, such as hundreds or thousands of nodes and links. Increasing the number of links between nodes can increase the computational complexity of providing a recommendation and can decrease the probability of recommending a given electronic content item to a client. For example, a first electronic content item may be associated with a first client and similar to a second electronic content item. The similarity of the first and second content items may indicate that the second electronic content item is potentially interesting to the first client. If the second electronic content item is separated from the first client by a large number of links, a recommendation algorithm may not recommend the second electronic content item to the first client despite the similarity of the first and second electronic content items. In another example, a first electronic content item may be associated with a first client and similar to a second electronic content item associated with a second client and similar to the first electronic content item. If no link or set of links in a social graph exists between the first client and the second client or second content item, a recommendation algorithm may determine that the second electronic content item is not to be recommended to the first client.

Figure 3:
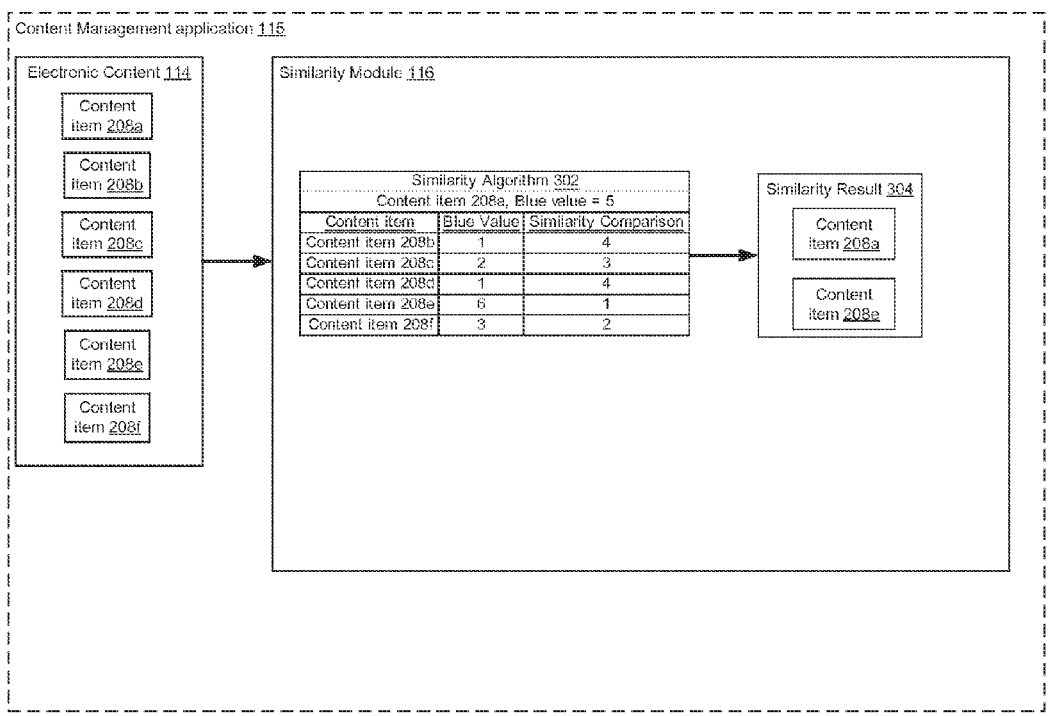
FIG. 3 is a modeling diagram illustrating determining that electronic content items are similar to one another.

FIG. 3 is a modeling diagram illustrating determining that electronic content items 208a, 208e are similar to one another. The content management application 115 can provide the content items 208a-e of electronic content 114 to the similarity module 116. The similarity module 116 can execute a similarity algorithm 302 to determine which of the content items 208a-e are similar to one another.

The similarity module 116 can automatically generate additional links between nodes in a social graph using a similarity algorithm. For example, an electronic content item 208a may be an image depicting a bottle of soda having a brand label and an electronic content item 208e may be a different image depicting a bottle of soda having the same brand label and using the same or similar lighting as the electronic content item 208a. A similarity algorithm can recognize similarities in the shape of the bottle, the color palette of the brand label, and/or the lighting. The content management application 115 automatically generates a link 402 between the electronic content items 208a, 208e based on the similarity algorithm executed by the similarity module 116 determining that the images are similar to one another.

Automatically generating a link 402 directly between the electronic content items 208a, 208e can reduce the number of intermediate links between a client account 204a and the electronic content item 208e traversed by a recommendation algorithm. A recommendation algorithm of the recommendation module 117 is thereby more likely to return the electronic content item 208e as a recommendation to the client account 204a.

In the non-limiting example depicted in FIG. 3, the content items 208a-e can be images. In some embodiments, the similarity algorithm 302 can compare values for certain colors in the images to determine which of the items 208a-e are similar to one another. In other embodiments, the similarity algorithm 302 can compare values representative of color palettes for the images to determine which of the items 208a-e are similar to one another. For example, the content item 208a can have a value for the color blue that is 5. The "blue" value can be an average value of the different values of blue for the various pixels in each image. The similarity algorithm can compare the "blue" values for the content items 208b-f to determine which of the content items 208b-f has a "blue" value that is closest to the "blue" value of 5. Content item 208b can have a "blue" value of 1, such that the similarity comparison yields 5−4=1. Content item 208c can have a "blue" value of 2, such that the similarity comparison yields 5−2=3. Content item 208d can have a "blue" value of 1, such that the similarity comparison yields 5−2=4. Content item 208e can have a "blue" value of 6, such that the similarity comparison yields 5−6=−1, or a magnitude of 1. Content item 208f can have a "blue" value of 3, such that the similarity comparison yields 5−3=2.

The similarity result 304 can be determined based on which similarity comparison shows the smallest difference between "blue" values. As depicted in FIG. 3, the similarity result 304 reflects that the "blue" values for content items 208a, 208e have the smallest difference, and are therefore the most similar.

Although FIG. 3 depicts a similarity algorithm comparing a single color value for images, any suitable similarity algorithm can be used to determine similarities between any number of values for any type of electronic content items.

A similarity algorithm can be any suitable algorithm for identifying one or more attributes that are shared by multiple electronic content items and that have values within a specified range. For example, the similarity algorithm can analyze attributes of electronic content items and generate a vector having values describing the attribute. In some embodiments, the similarity algorithm can determine that two electronic content items are similar based on the respective vectors having values describing the same attribute and being within a certain range of values. In other embodiments, the similarity algorithm can determine that two electronic content items are similar based on each of the vectors having a respective value representative of the respective vector that are within a specified range. A non-limiting examples of a representative values for a vector is a statistic computed using the values in the vector.

In another non-limiting example, a similarity algorithm may identify that the color palettes of two images are similar. A color palette can include a given, finite set of colors used in an image. The similarity algorithm can analyze each pixel of each of the images to determine a list of all of the colors used in the images. The similarity algorithm can also determine the number of pixels using each color. The similarity algorithm can determine that the two images are similar to one another based at least in part on the two images having similar numbers of pixels of the same color. The similarity algorithm can determine that an image including a majority of pixels that are red and a minority of pixels that are blue is similar to a second image including a majority of pixels that are red and a minority of pixels that are blue. The similarity algorithm can also determine that the image is different from a third image including a majority of pixels that are green.

Figure 4:
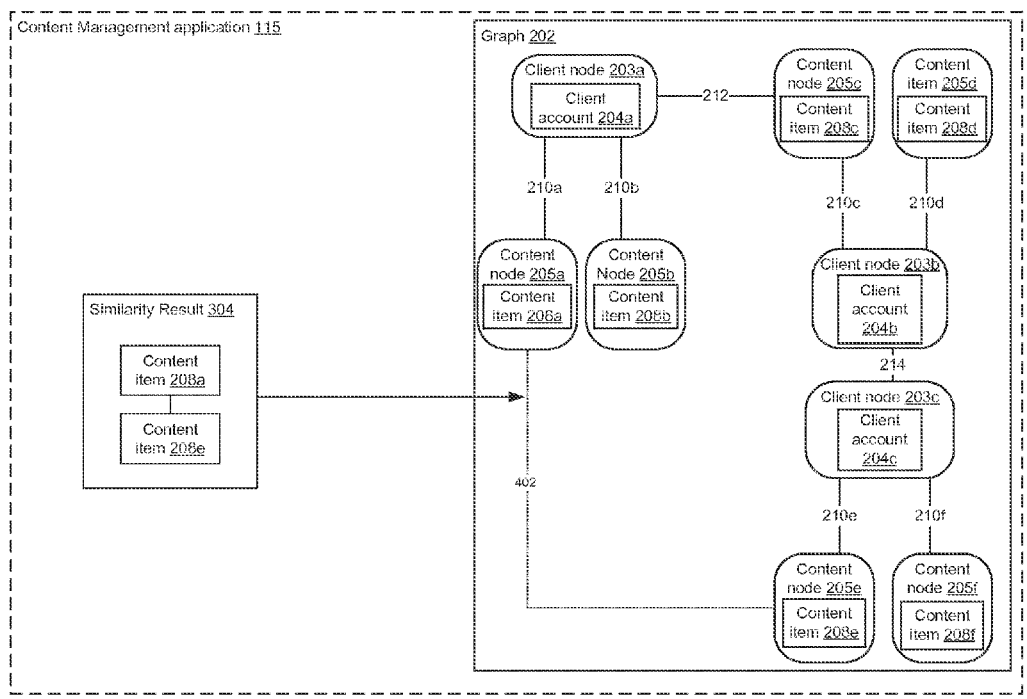
FIG. 4 is a modeling diagram illustrating an example link between similar electronic content items that is automatically generated by a content management application.

The similarity result 304 generated by applying the similarity algorithm 302 can be used to add links between similar content items on the graph 202, and thereby increase the probability that a recommendation algorithm will recommend an electronic content item to a client, regardless of the number of (or absence of) intermediate links between the electronic content item and the client. FIG. 4 is a modeling diagram illustrating an example link 402 between similar electronic content items 208a, 208e that is automatically generated by a content management application 115 based on the similarity result 304 generated by the similarity module 116.

Figure 5:
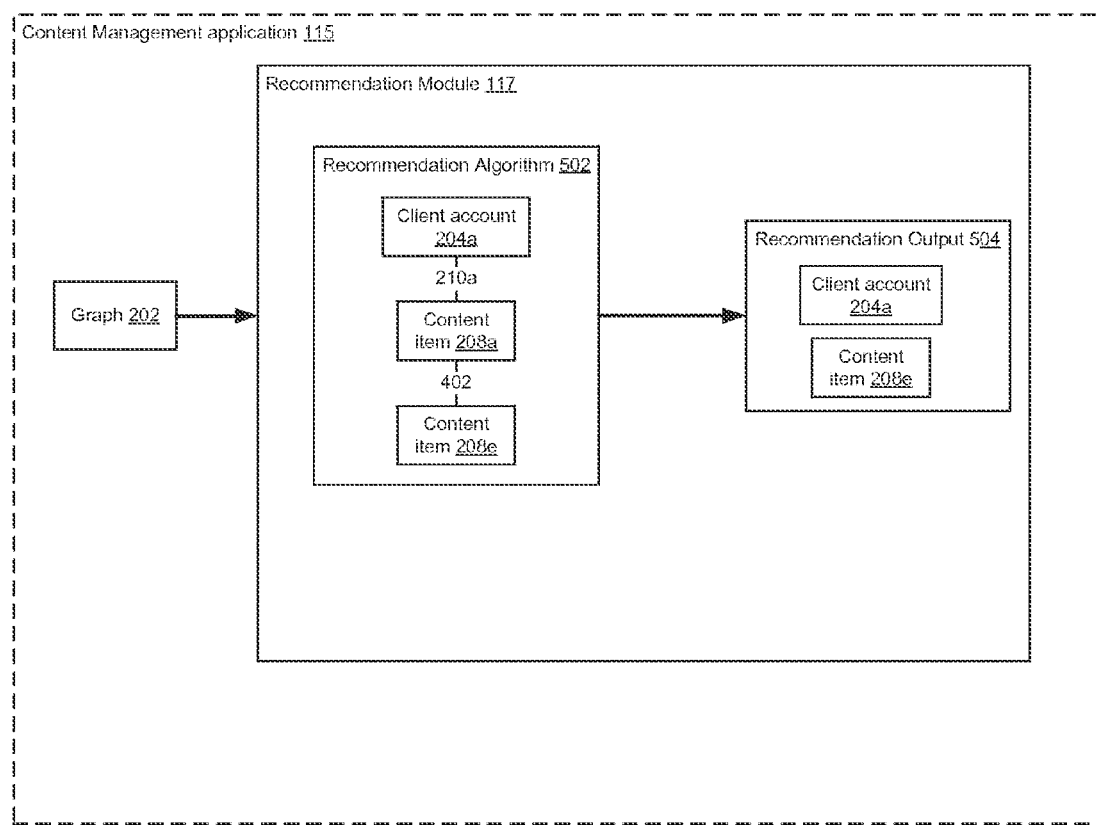
FIG. 5 is a modeling diagram illustrating generating a recommendation output based on electronic content items being similar to one another.

FIG. 5 is a modeling diagram illustrating generating a recommendation output 504 based on electronic content items 208a, 208e being similar to one another. The content management application 115 can provide the graph 202 to the recommendation module 117. The recommendation module 117 can execute a recommendation algorithm 502 that can use as at least one input the link 402, which is generated between content items 208a, 208e based on their similarity to one another. The recommendation algorithm 502 can determine that the client account 204a may be interested in the content item 208e based on the link 402 between the content items 208a, 208e and the link 210a between the content item 208a and the client account 204a. The recommendation algorithm 502 can generate a recommendation output 504 indicating that content item 208e is to be recommended to client account 204a.

Although FIG. 4 depicts a single link 402 between two electronic content items 208a, 208e, any number of links can be automatically generated between electronic content items based on applying a similarity algorithm to the graph 202.

In some embodiments, the similarity module 116 can be configured to add links only between electronic content items having a threshold level of similarity. In other embodiments, the similarity module 116 can be configured to add links only between a first electronic content item and a predetermined number of electronic content items that are the most similar to the first electronic content item. For example, a similarity module 116 may add links only between a first electronic content item and the three most similar electronic content items. The similarity module 116 can be executed periodically to update the links between similar items of electronic content. Thus, if a newly added electronic content item is more similar to the first electronic content item than any of the three linked electronic content items, a new link to the newly added electronic content item can be created and the link to the least similar of the three previously linked electronic content items can be deleted. In other embodiments, the similarity module 116 can generate a sufficient number of links to provide a minimal spanning tree connecting all of the nodes of the graph 202 using the minimum number of links automatically generated by the recommendation algorithm.

Figure 6:
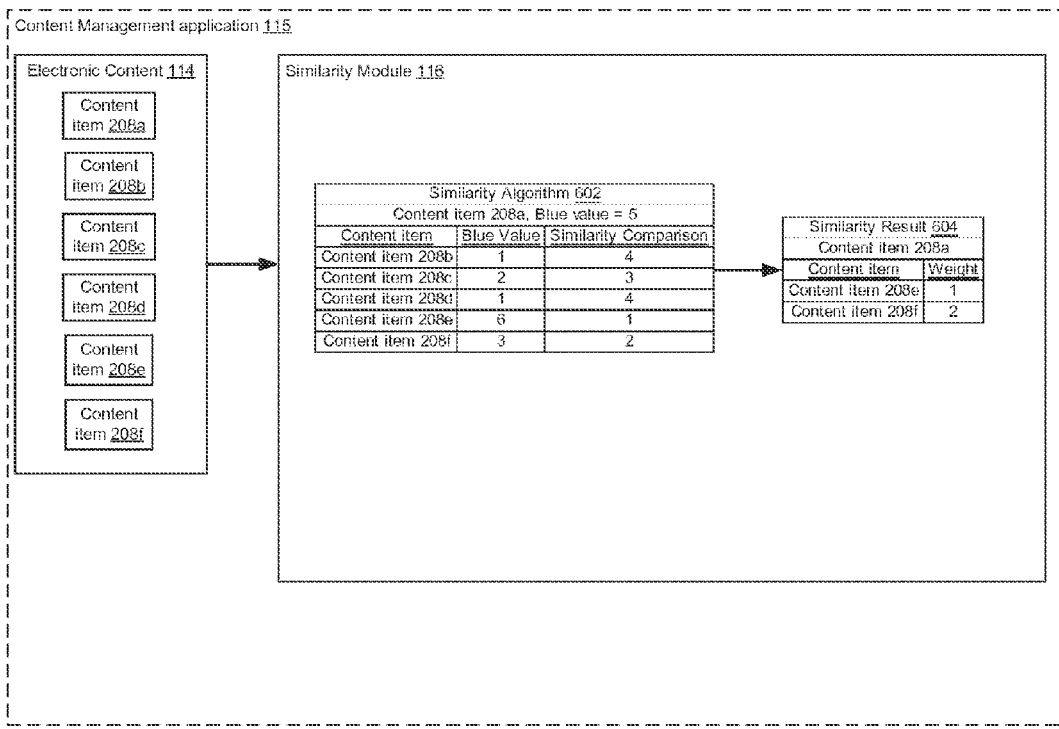
FIG. 6 is a modeling diagram illustrating determining weighted similarities between an electronic content item and other electronic content items.

For example, FIG. 6 is a modeling diagram illustrating determining weighted similarities between an electronic content item 208a and other electronic content items 208e, 208f. The content management application 115 can provide the content items 208a-e of electronic content 114 to the similarity module 116. The similarity module 116 can execute a similarity algorithm 602 to determine multiple content items that are similar to content item 208a.

In the non-limiting example depicted in FIG. 6, the content items 208a-e can be images. The similarity algorithm 302 can compare values for certain colors in the images to determine which of the items 208a-e are similar to one another. For example, the content item 208a can have a value for the color blue that is 5. The similarity algorithm can compare the "blue" values for the content items 208b-f to determine which of the content items 208b-f has a "blue" value that is closest to the "blue" value of 5. Content item 208b can have a blue value of 1, such that the similarity comparison yields 5−4=1. Content item 208c can have a blue value of 2, such that the similarity comparison yields 5−2=3. Content item 208d can have a blue value of 1, such that the similarity comparison yields 5−2=4. Content item 208e can have a blue value of 6, such that the similarity comparison yields 5−6=−1, or a magnitude of 1. Content item 208f can have a blue value of 3, such that the similarity comparison yields 5−3=2.

The similarity result 604 can be determined based on which two similarity comparisons shows the smallest differences between blue values. As depicted in FIG. 6, the similarity result 304 reflects that the blue values for content items 208a, 208e have the smallest difference and the blue values for content items 208a, 208f have the second smallest difference, and are therefore the most similar. A weight of 1 can represent the most similar content item 208e. A weight of 2 can represent the second most similar content item 208f.

Figure 7:
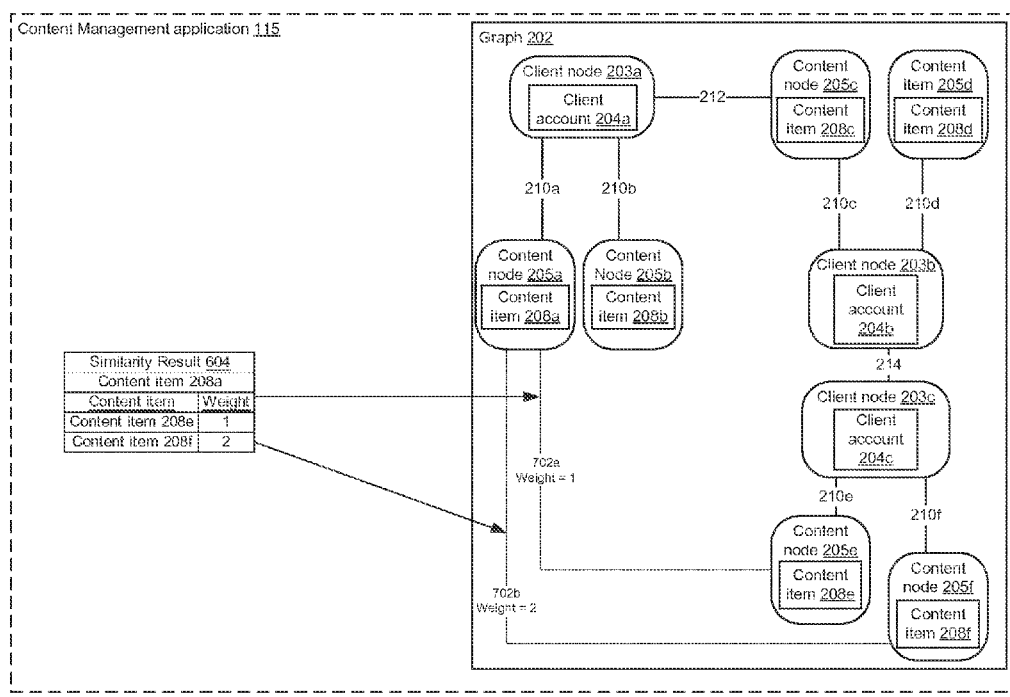
FIG. 7 is a modeling diagram illustrating example weighted links between similar electronic content items that are automatically generated by a content management application.

The similarity result 304 generated by applying the similarity algorithm 602 can be used to links content item 208a and the two most similar content items 208e, 208f. FIG. 7 is a modeling diagram illustrating example weighted links between similar electronic content items. The content management application 115 can generate a link 702a having a weight of 1 based on the content item 208e being the most similar to the content item 208a. The content management application 115 can generate a link 702b having a weight of 2 based on the content item 208f being the most similar to the content item 208a. Although FIG. 7 depicts two links 402 between electronic content item 208a and electronic content items 208e, 208f, any number of links can be automatically generated between electronic content items based on applying a similarity algorithm to the graph 202.

Figure 8:
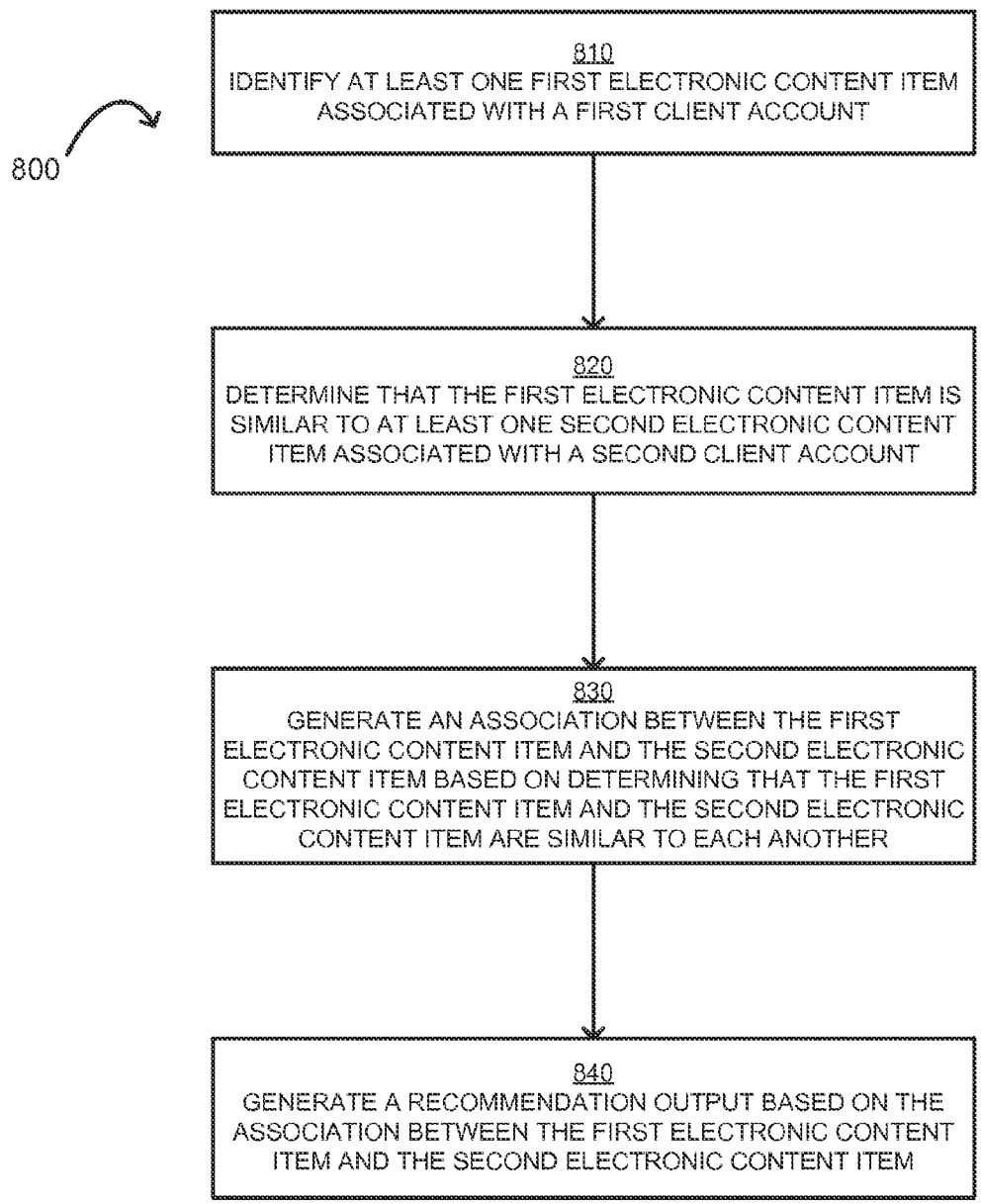
FIG. 8 is a flow chart illustrating an example method for generating recommendations from a graph augmented by a similarity algorithm.

The content management application 115 can be executed at the server system 102 by the processor 104 to automatically generate links between similar electronic content items in the graph 202 and generate recommendations based on the similarity of electronic content items. FIG. 8 is a flow chart illustrating an example method 800 for generating recommendations from a graph 202 augmented by a similarity algorithm. For illustrative purposes, the method 800 is described with reference to the system implementations depicted in FIG. 1. Other implementations, however, are possible.

The method 800 involves identifying at least one first electronic content item associated with a first client, as shown in block 810. The processor 104 of the server system 102 can execute the content management application 115 to identify the first electronic content item. For example, the content management application 115 can identify that the content item 208a is associated with the client account 204a. In some embodiments, associations between the clients and the respective electronic content items are explicit associations. In other embodiments, associations between the clients and the electronic content items are implicit associations.

The method 800 further involves determining that the at least one first electronic content item is similar to at least one second electronic content item associated with a second client, as shown in block 820. The processor 104 of the server system 102 can execute the similarity module 116 of the content management application 115 to determine that the first electronic content item is similar to a second electronic content item associated with a second client. For example, the similarity module 116 can determine that the content item 208a is similar to the content item 208e associated with the client account 204c.

In some embodiments, the similarity module 116 automatically determines that the electronic content items 208a, 208e are similar to each other independently from any input received from the first client account 204a or the second client account 204c. Automatically determining that electronic content items 208a, 208e are similar can include the processor 104 of the server system 102 executing the similarity module 116 without any input from a computing system 103a associated with the first client account 204a or from a computing system 103b associated with the second client account 204c. Automatically determining that electronic content items 208a, 208e are similar can additionally or alternative include the processor 104 of the server system 102 executing the similarity module 116 in response to events other than input from a computing system 103a associated with the first client account 204a or from a computing system 103b associated with the second client account 204c.

In additional or alternative embodiment, the similarity module 116 determines that the electronic content items 208a, 208e are similar based on shared attributes among the electronic content items 208a, 208e having values within a specified range. The similarity module 116 can determine that the first electronic content item and the second electronic content item include at least one shared attribute. The similarity module 116 can determine that each of the first electronic content item and the second electronic content item has at least one respective value for the at least one shared attribute within a specified range.

In one example, electronic content items 208a, 208e may be images having a shared attribute such as a color palette. The similarity module 116 can determine that the color palette for each image includes, for example, at least a given number of pixels for one or more given colors. The similarity module 116 can determine that the images are similar to one another based on the color palette for each image including the given number of pixels for the one or more given colors.

In another example, electronic content items 208a, 208e may be text files having a shared attribute such as a text string or a group of text strings. The similarity module 116 can determine that each text file includes, for example, a threshold amount of matching text. The similarity module 116 can determine that the text files are similar to one another based on the files including the threshold amount of matching text.

In another example, electronic content items 208a, 208e may be different types of electronic content having a shared metadata attribute such as an author, an associated geographical location, an associated time period, etc. The similarity module 116 can analyze metadata associated with each of the electronic content items 208a, 208e to determine that both of electronic content items 208a, 208e have the same metadata attribute and that the metadata attribute has the same value.

The method 800 further involves generating an association between the first electronic content item and the second electronic content item based on determining that the first electronic content item and the second electronic content item are similar to each another, as shown in block 830. The processor 104 can execute the similarity module 116 to generate the association between electronic content items. For example, the similarity module 116 can generate a link 402 in the graph 202 between the content item 208a and the content item 208e.

The method 800 further involves generating a recommendation output based at least partially on the association between the first electronic content item and the second electronic content item, as shown in block 840. The processor 104 can execute the recommendation module 117 to generate the recommendation output. The recommendation module 117 can execute a recommendation algorithm using at least part of the graph 202 as an input and generating a recommendation as an output.

A non-limiting example of a recommendation algorithm is a random walk algorithm. The random walk algorithm can be executed for every node in a social graph for which a recommendation is desirable. Each node can have a respective number of links from the node to other nodes. For example, for a given starting node having ten links, the probability of selecting one of those links to traverse the graph is ten percent. As the graph is traversed starting from the starting node, a number of visited nodes can be encountered. Each time a visited node in the graph is encountered, a counter can be incremented. For example, a visited node can be visited four times and the counter can be incremented each time to reflect a total of four visits. The number of times a visited node is visited can depend on how far the starting node is from the visited node. In addition, a certainly probability exists that the traversal of the graph is ended and the algorithm returns to the starting node to start traversing the graph again from the starting node. Thus, for a graph having one thousand nodes in which a given node is visited one hundred times, the probability of visiting the given node is ten percent. Nodes having a higher probability can be selected as providing a higher quality recommendation.

In some embodiments, the content management application 115 can represent clients and electronic content items using an adjacency matrix. An adjacency matrix represents which nodes of a graph are adjacent to which other node. For example, an adjacency matrix of a graph having n nodes can be an n×n matrix. A non-diagonal entry can identify the number of links from a node i to a node j. The entry can also identify a weight of the links between nodes. For example, a zero value for a link can indicate that a link does not exist and therefore that a zero percent probability exists of traversing the graph using the non-existent link. An entry of 0.1 between a first and second node can indicate a ten percent probability of traversing the graph using the link. A recommendation algorithm can apply a matrix computation to the adjacency matrix to identify the probability of visiting a given node when the graph is traversed from a given starting node. Applying a recommendation algorithm of the recommendation module 117 to the adjacency matrix can generate additional links for the adjacency matrix, thereby increasing the probability of visiting a given node when the graph is traversed from a given starting node.

In additional or alternative embodiments, specific types of nodes can be filtered from the recommendation algorithm. For example, a graph can have nodes for both text and images. A recommendation algorithm for selecting a recommended image can ignore text nodes.

In additional or alternative embodiments, links in a graph can be weighted, as depicted in FIG. 7. For example, a starting node can have ten links. Two of those links can be weighted as having a higher probability of leading to another node representing a higher quality recommendation. In some embodiments, the weighting can be based on preference data identifying content preferences of a client. Non-limiting examples of preference data can include a geographical location associated with electronic content items, a time period associated with electronic content items, an author of electronic content items, an application for using electronic content items. In other embodiments, the weighting can be based on a degree of similarity between two electronic content items.

In additional or alternative embodiments, the recommendation output can augment search results returned in response to a query. For example, a content management application 115 can provide a graph 202 including only the electronic content items corresponding to one or more search criteria and the electronic content items associated with a client from which the search criteria originated. A recommendation algorithm of the recommendation module 117 can be applied to the graph 202 to determine which of the electronic content items corresponding to one or more search criteria are similar to the electronic content items associated with the client. The recommendation output can identify which of the search results are most likely to be of interest to the client initiating the search.

Although the example method 800 is described with respect to two electronic content items and two client accounts, the similarity module 116 and recommendation module 117 may be executed using any number of electronic items and client accounts. For example, the similarity module 116 can generate at least one similarity link for each content item in the graph 202 in order to achieve a spanning tree. The recommendation module 117 can, for each client account, generate a list of recommended content items, based in part on the similarity links and in part on all other links in the graph.

Figure 9:
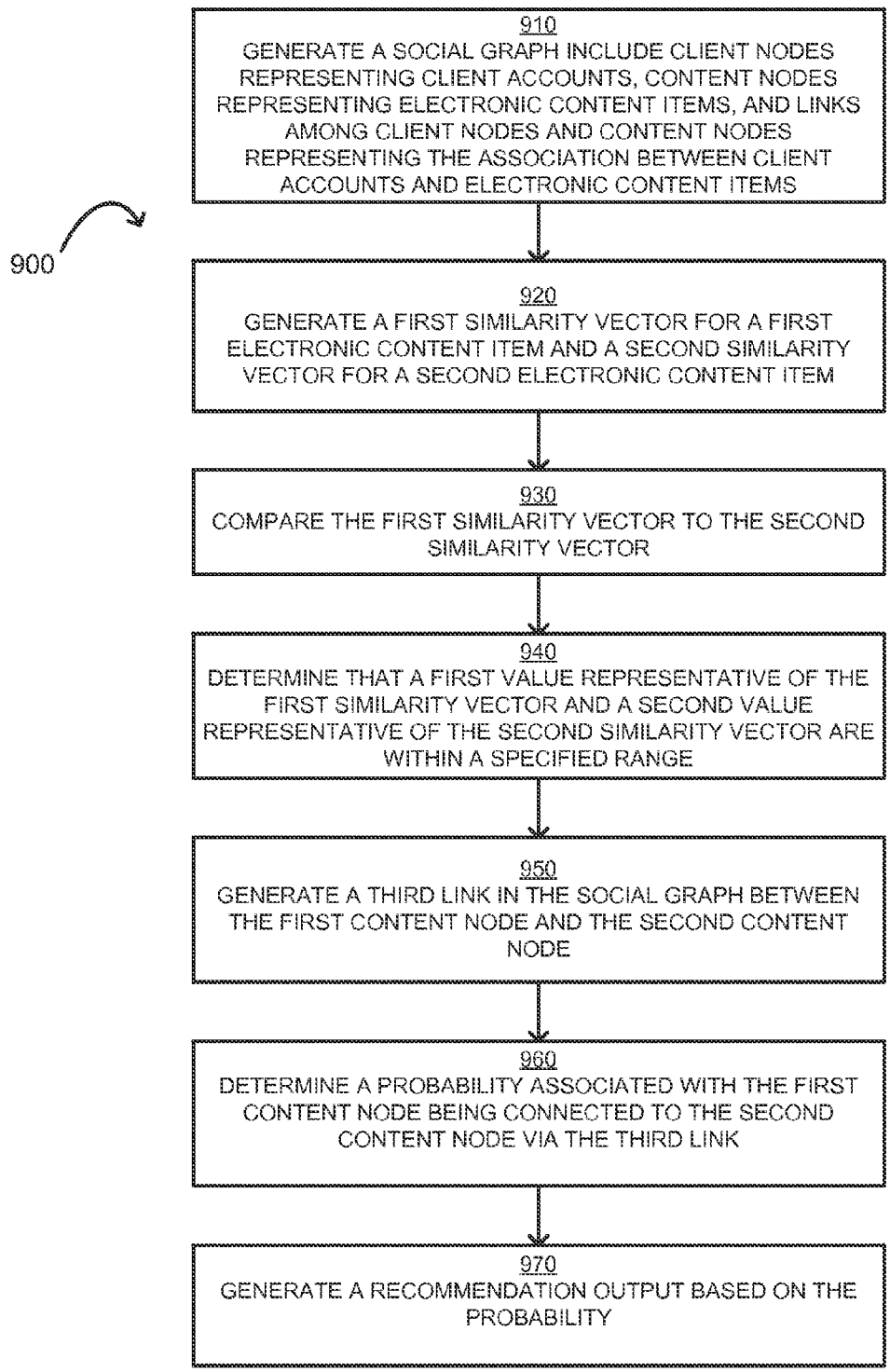
FIG. 9 is a flow chart illustrating an additional example method for generating recommendations from a graph augmented by a similarity algorithm.

FIG. 9 is a flow chart illustrating an example method 900 for generating recommendations from a graph 202 augmented by a similarity algorithm. For illustrative purposes, the method 900 is described with reference to the system implementations depicted in FIG. 1. Other implementations, however, are possible.

The method 900 involves generating a social graph 202 include client nodes 203a-c representing client accounts 204a-c, content nodes 205a-f representing electronic content items 208a-f, and links among client nodes 203a-c and content nodes 205a-f representing the associations between client accounts 204a-c and electronic content items 208a-f, as shown in block 910. The processor 104 of the server system 102 can execute the content management application 115 to generate the graph 202.

The method 900 further involves generating a first similarity vector for a first electronic content item, such as content item 208a, and a second similarity vector for a second electronic content item, such as content item 208e, as shown in block 920. The processor 104 of the server system 102 can execute the content management application 115 to generate the similarity vectors. For example, the similarity module 116 can determine that content items 208a, 208e are images. The similarity module 116 can generate similarity vectors representative of the respective color palettes for each image.

The method 900 further involves comparing the first similarity vector to the second similarity vector, as shown in block 930. The processor 104 can execute the similarity module 116 to compare the similarity vectors. For example, the similarity module 116 can compare a vector corresponding to the color palette of an image content item 208a to a vector corresponding to the color palette of an image content item 208e.

The method 900 further involves determining that a first value representative of the first similarity vector and a second value representative of the second similarity vector are within a specified range, as shown in block 940. The processor 104 can execute the similarity module 116 to generate the respective representative values. For example, the similarity module 116 can determine that an average blue value for the color palette of an image content item 208a and an average blue value for the color palette of an image content item 208e have values that differ by less than 2.

The method 900 further involves generating a third link in the social graph 202 between the first content node and the second content node, such as the link 402, as shown in block 950. The processor 104 can execute the content management application 115 to generate the third link. For example, the link 702 can be generated between content nodes 205a, e, that respectively represent the image content items 208a, 208e based on the average blue values for the image content items 208a, 208e differing by less than 2.

The method 900 further involves determining a probability associated with content node 205a being connected to the content node 205b via the link 702, as shown in block 960. The processor 104 can execute the recommendation module 117 to determine the probability. For example, the recommendation module 117 can execute a recommendation algorithm that is a random walk algorithm based on the links from client node 203a. The link 702 between content nodes 205a, 205e can increase the probability of selecting the link 702 to traverse the graph 202 from client node 203a to content node 205e by executing the random walk algorithm.

The method 900 further involves generate a recommendation output based on the probability, as shown in block 960. The processor 104 can execute the recommendation module 117 to generate the recommendation output based on the probability. For example, the increased probability of selecting the link 702 to traverse the graph 202 from client node 203a to content node 205e can indicate the content item 208e represented by the content node 205e is potentially interesting to the client account 204a represented by the client node 203a. The recommendation module 117 can include the content item 208e in a recommendation output 504 that recommends the content item 208e to the client account 204a.

Although the example method 900 is described with respect to two electronic content items that are images and two client accounts, the similarity module 116 and recommendation module 117 may be executed using any number of electronic items of any type and any number of client accounts.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
identifying, by a processing device, at least one first electronic content item represented by a first content node in a social graph that is linked to a first client node in the social graph representing a first client account;
determining, by the processing device, that the least one first electronic content item is similar to at least one second electronic content item represented by a second content node in the social graph that is linked to a second client node in the social graph representing a second client account;
generating, by the processing device, a third link in the social graph between the first content node and the second content node representing an association between the least one first electronic content item and the least one second electronic content item based on determining that the least one first electronic content item and the least one second electronic content item are similar to each another;
determining, by the processing device, a probability of traversing the social graph from the first client node to the second client node via the third link representing the association; and
generating, by the processing device, a recommendation output based at least partially on the probability that is determined using the association between the least one first electronic content item and the least one second electronic content item.

2. The method of claim 1, further comprising:
generating the social graphs;
wherein determining that the least one first electronic content item and the least one second electronic content item are similar to each other comprises:
generating a first similarity vector for the first electronic content item and a second similarity vector for the second electronic content item,
comparing the first similarity vector to the second similarity vector, and
determining that a first value representative of the first similarity vector and a second value representative of the second similarity vector are within a specified range.

3. The method of claim 2, further comprising assigning a weight to the third link based on a degree of similarity between the first similarity vector and the second similarity vector.

4. The method of claim 3, further comprising modifying the weight assigned to the third link based on a preference data associated with one or more of the first client account and the second client account.

5. The method of claim 1, wherein determining that the least one first electronic content item is similar to the least one second electronic content item comprises:
determining that the least one first electronic content item and the least one second electronic content item include at least one shared attribute; and
determining that each of the least one first electronic content item and the least one second electronic content item has at least one respective value for the at least one shared attribute within a specified range.

6. The method of claim 5, wherein the least one first electronic content item and the least one second electronic content item comprise image content and wherein the at least one shared attribute comprises a color palette.

7. The method of claim 5, wherein the least one first electronic content item and the least one second electronic content item comprise text content and wherein the at least one shared attribute comprises a text string.

8. A non-transitory computer-readable medium embodying program code executable by a processing device, the non-transitory computer-readable medium comprising:
program code for identifying at least one first electronic content item represented by a first content node in a social graph that is linked to a first client node in the social graph representing a first client account;
program code for determining that the least one first electronic content item is similar to at least one second electronic content item represented by a second content node in the social graph that is linked to a second client node in the social graph representing a second client account;
program code for generating a third link in the social graph between the first content node and the second content node representing an association between the least one first electronic content item and the least one second electronic content item based on determining that the least one first electronic content item and the least one second electronic content item are similar to each another;
program code for determining a probability of traversing the social graph from the first client node to the second client node via the third link representing the association; and
program code for generating a recommendation output based at least partially on the probability that is determined using the association between the least one first electronic content item and the least one second electronic content item.

9. The non-transitory computer-readable medium of claim 8, wherein the program code for determining that the least one first electronic content item is similar to the least one second electronic content item comprises:
program code for determining that the least one first electronic content item and the least one second electronic content item include at least one shared attribute; and
program code for determining that each of the least one first electronic content item and the least one second electronic content item has at least one respective value for the at least one shared attribute within a specified range.

10. The non-transitory computer-readable medium of claim 9, wherein the least one first electronic content item and the least one second electronic content item comprise image content and wherein the at least one shared attribute comprises a color palette.

11. The non-transitory computer-readable medium of claim 9, wherein the least one first electronic content item and the least one second electronic content item comprise text content and wherein the at least one shared attribute comprises a text string.

12. The non-transitory computer-readable medium of claim 8, wherein the recommendation output comprises a reference to at least one of the least one first electronic content item or the least one second electronic content item, wherein the recommendation output is provided based at least partially on criteria other than the electronic content item matching search criteria provided by the first or the second client account.

13. The non-transitory computer-readable medium of claim 8, wherein the least one second electronic content item comprises one or a plurality of results returned in response to a query and wherein the recommendation output comprises an identification of the least one second electronic content item as a relevant search result.

14. The non-transitory computer-readable medium of claim 8, further comprising program code for assigning a weight to the association based on preference data associated with the first client account.

15. The non-transitory computer-readable medium of claim 14, wherein the preference data comprises one or more of a geographical location associated with the least one second electronic content item, a time period associated with the least one second electronic content item, an author of the least one second electronic content item, an application for using the least one second electronic content item.

16. The non-transitory computer-readable medium of claim 8, further comprising program code for assigning a weight to the association based on a degree of similarity between the least one first electronic content item and the least one second electronic content item.

17. A system comprising:
a processor configured to execute instructions stored in a non-transitory computer-readable medium;
wherein the instructions comprise one or more modules configured to perform operations comprising:
identifying at least one first electronic content item represented by a first content node in a social graph that is linked to a first client node in the social graph representing a first client account,
determining that the least one first electronic content item is similar to at least one second electronic content item represented by a second content node in the social graph that is linked to a second client node in the social graph representing a second client account,
generating a third link in the social graph between the first content node and the second content node representing an association between the least one first electronic content item and the least one second electronic content item based on determining that the least one first electronic content item and the least one second electronic content item are similar to each another,
determining a probability of traversing the social graph from the first client node to the second client node via the third link representing the association, and
generating a recommendation output based at least partially on the probability that is determined using the association between the least one first electronic content item and the least one second electronic content item.

18. The system of claim 17, wherein the one or more modules are further configured to automatically determine that the least one first electronic content item and the least one second electronic content item are similar independently from input from a first client account computing device associated with the first client account or a second client account computing device associated with the second client account.

19. The system of claim 17, wherein the one or more modules are further configured to:
generate the social graph stored in the non-transitory computer-readable medium.

20. The system of claim 17, wherein the one or more modules are further configured to assign a weight to the association based on a degree of similarity between the least one first electronic content item and the least one second electronic content item.

* * * * *